United States Patent
Otani et al.

(10) Patent No.: US 7,508,980 B2
(45) Date of Patent: Mar. 24, 2009

(54) METHOD FOR PREPARING STEREO IMAGE AND THREE-DIMENSIONAL DATA PREPARATION SYSTEM

(75) Inventors: Hitoshi Otani, Itabashi-ku (JP);
Tadayuki Ito, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 670 days.

(21) Appl. No.: 11/257,446

(22) Filed: Oct. 24, 2005

(65) Prior Publication Data
US 2006/0126923 A1    Jun. 15, 2006

(30) Foreign Application Priority Data
Dec. 14, 2004   (JP)   ............................. 2004-361068

(51) Int. Cl.
*G06K 9/00* (2006.01)
(52) U.S. Cl. .................. 382/154; 382/284; 382/286
(58) Field of Classification Search ................ 382/154, 382/284, 286, 291
See application file for complete search history.

(56) References Cited

U.S. PATENT DOCUMENTS

| | | | |
|---|---|---|---|
| 5,033,845 A * | 7/1991 | Sorimachi et al. ........... 356/3.01 |
| 5,983,161 A * | 11/1999 | Lemelson et al. ........... 701/301 |
| 6,226,389 B1 * | 5/2001 | Lemelson et al. ........... 382/104 |
| 6,487,500 B2 * | 11/2002 | Lemelson et al. ........... 701/301 |
| 6,712,700 B1 * | 3/2004 | Imai et al. ........................ 463/31 |

FOREIGN PATENT DOCUMENTS

| | | |
|---|---|---|
| EP | 0 964 223 | 12/1999 |
| EP | 1 347 267 | 9/2003 |
| JP | 2004-317237 | 11/2004 |

* cited by examiner

*Primary Examiner*—Yosef Kassa
(74) *Attorney, Agent, or Firm*—Nields, Lemack & Frame, LLC

(57) ABSTRACT

A method for preparing stereo images by using a surveying instrument, which comprises an image pickup means for acquiring an image in a collimating direction, and a distance measuring and angle measuring means for measuring a distance and angle of a collimating point, comprising a step of measuring distances and angles on at least three collimating points by installing said surveying instrument at a known point, a step of measuring angles on the three collimating points by setting said surveying instrument at an unknown point, a step of calculating coordinates of the unknown point based on surveying data of the three collimating points, a step of acquiring images from each of the known point and the unknown point for at least one of said three collimating points, and a step of preparing stereo images from the images from the known point and the unknown point based on coordinate data of the known point, distance measurement data, and angle measurement data from the known point, and based on coordinate data and angle measurement data calculated with respect to the unknown point.

5 Claims, 7 Drawing Sheets

METHOD FOR PREPARING STEREO IMAGE AND THREE-DIMENSIONAL DATA PREPARATION SYSTEM

BACKGROUND OF THE INVENTION

The present invention relates to a method for preparing stereo images by taking images of an object at least from two directions and for preparing stereo images from a plurality of images thus taken. The present invention also relates to a system for preparing 3-demensional data based on a stereo image by associating the stereo image with measured data.

A stereo image is an image to represent an object stereoscopically, and the stereo image is an image acquired through image pickup of the same object by changing image pickup directions. By associating points on respective images with each other, it is possible to obtain 3-dimensional data of points, which constitute the image.

For the purpose of obtaining 3-dimensional data from a stereo image, it is necessary to perform matching of two images (stereo-matching), and conditions to enable to perform stereo matching (external orientation elements) are required. As the external orientation elements, 3-dimensional data, image pickup directions, tiltings, magnifications, etc. of two image pickup points (camera positions) are respectively required.

In order to perform stereo matching of two images, it is necessary to have relative rotation of left and right cameras with respect to a base line vector between the left and right cameras, i.e. relative orientation elements. The relative orientation elements are calculated based on the external orientation elements.

In the past, when a stereo image is to be prepared, images of an object are taken by a camera from two known points respectively, and external orientation elements necessary for calculating relative orientation elements are obtained. For this reason, it is necessary to set reference points on the object, to separately measure the reference points by a total station or the like, and to find positions and tiltings of the cameras based on 3-demensional position information of the reference points.

In this respect, it is necessary to perform photogrammetry to obtain a stereo image, to set reference points (pass points) in the image after photogrammetry, and to perform measurement on the reference points by a surveying instrument such as a total station from two known points where images have been taken respectively. Moreover, six or more pass points are required, for instance, and this leads to complicated measuring operation.

SUMMARY OF THE INVENTION

It is an object of the present invention to simplify relative orientation operation, to facilitate association for preparation of a stereo image and to simplify 3-dimensional measurement operation based on the stereo image.

To attain the obtain object, the present invention provides a method for preparing stereo images by using a surveying instrument, which comprises an image pickup means for acquiring an image in a collimating direction, and a distance measuring and angle measuring means for measuring a distance and an angle of a collimating point, comprising a step of measuring distances and angles on at least three collimating points by installing the surveying instrument at a known point, a step of measuring angles on the three collimating points by installing the surveying instrument at an unknown point, a step of calculating coordinates of the unknown point based on surveying data of the three collimating points, a step of acquiring images from each of the known point and the unknown point for at least one of the three collimating points, and a step of preparing stereo images from the images from the known point and the unknown point based on coordinate data of the known point, distance measurement data, and angle measurement data from the known point, and based on coordinate data and angle measurement data calculated with respect to the unknown point. Also, the present invention provides the method for preparing stereo images as described above, wherein at least three collimating points can be collimated from the known point and the unknown point, and, in the images acquired from the known point and the unknown point, collimating points from the known point and the unknown point are made correspond with each other based on deviation on the image. Further, the present invention provides the method for preparing stereo images as described above, wherein the method further comprises a step of acquiring images of all collimating points from the known point and the unknown point, and a step of making the collimating points of the images correspond with the collimating points of the image obtained at the known point respectively.

The present invention provides a three-dimensional data preparation system, which comprises an image pickup means for acquiring an image in a collimating direction, a distance measuring means capable to measure distance of the collimating point, an angle measuring means capable to measure an angle of the collimating point, a storage unit for storing distance measurement data, angle measurement data and the pickup image, and a control arithmetic unit, wherein the image pickup means takes images from a known point and an unknown point with respect to at least one collimating point among at least three collimating points, the control arithmetic unit calculates coordinate data of the unknown point based on coordinate data of the known point, distance measurement data and angle measurement data of at least three collimating points from the known point, and angle measurement data of the three collimating points from the unknown point, and prepares stereo images from the images based on the coordinate data, the distance measurement data, and the angle measurement data of the known point, and the calculated coordinate data and the angle measurement data of the unknown point. Also, the present invention provides the three-dimensional data preparation system as described above, wherein the two stereo images are associated with each other based on the coordinate data of the known point, the distance measurement data and the angle measurement data of at least three collimating points from the known point and the coordinate data of the unknown point and the angle measurement data from the unknown point, and 3-dimensional data is a calculated from the images thus associated.

According to the present invention, in a method for preparing stereo images by using a surveying instrument which comprises an image pickup means for acquiring an image in a collimating direction, and a distance measuring and angle measuring means for measuring a distance and an angle of a collimating point, the method comprises a step of measuring distances and angles on at least three collimating points by installing the surveying instrument at a known point, a step of measuring angles on the three collimating points by installing the surveying instrument at an unknown point, a step of calculating coordinates of the unknown point based on surveying data of the three collimating points, a step of acquiring images from each of the known point and the unknown point for at least one of the three collimating points and, a step of preparing stereo images from the images from the known point and the unknown point based on coordinate data of the known point, distance measurement data, and angle measurement data from the known point, and based on coordinate data and angle measurement data calculated with respect to the unknown point. As a result, there is no need to perform photogrammetry and surveying of pass points, and this extensively simplifies the preparation of stereo images.

Further, according to the present invention, a three-dimensional data preparation system comprises an image pickup means for acquiring an image in a collimating direction, a distance measuring means capable to measure distance of the collimating point, an angle measuring means capable to measure an angle of the collimating point, a storage unit for storing distance measurement data, angle measurement data and the pickup image, and a control arithmetic unit, the image pickup means takes images from a known point and an unknown point with respect to at least one collimating point among at least three collimating points, the control arithmetic unit calculates coordinate data of the unknown point based on coordinate data of the known point, distance measurement data and angle measurement data of at least three collimating points from the known point, and angle measurement data of the three collimating points from the unknown point, and prepares stereo images from the images based on the coordinate data, the distance measurement data, and the angle measurement data of the known point, and the calculated coordinate data and the angle measurement data of the unknown point. Thus, there is no need to have a device required for photogrammetry and a surveying instrument such as a total station. Measuring operation can be carried out by using a single system, and surveying operation can be extremely simplified.

DETAILED DESCRIPTION OF THE PREFERRED EMBODIMENT

Figure 1:
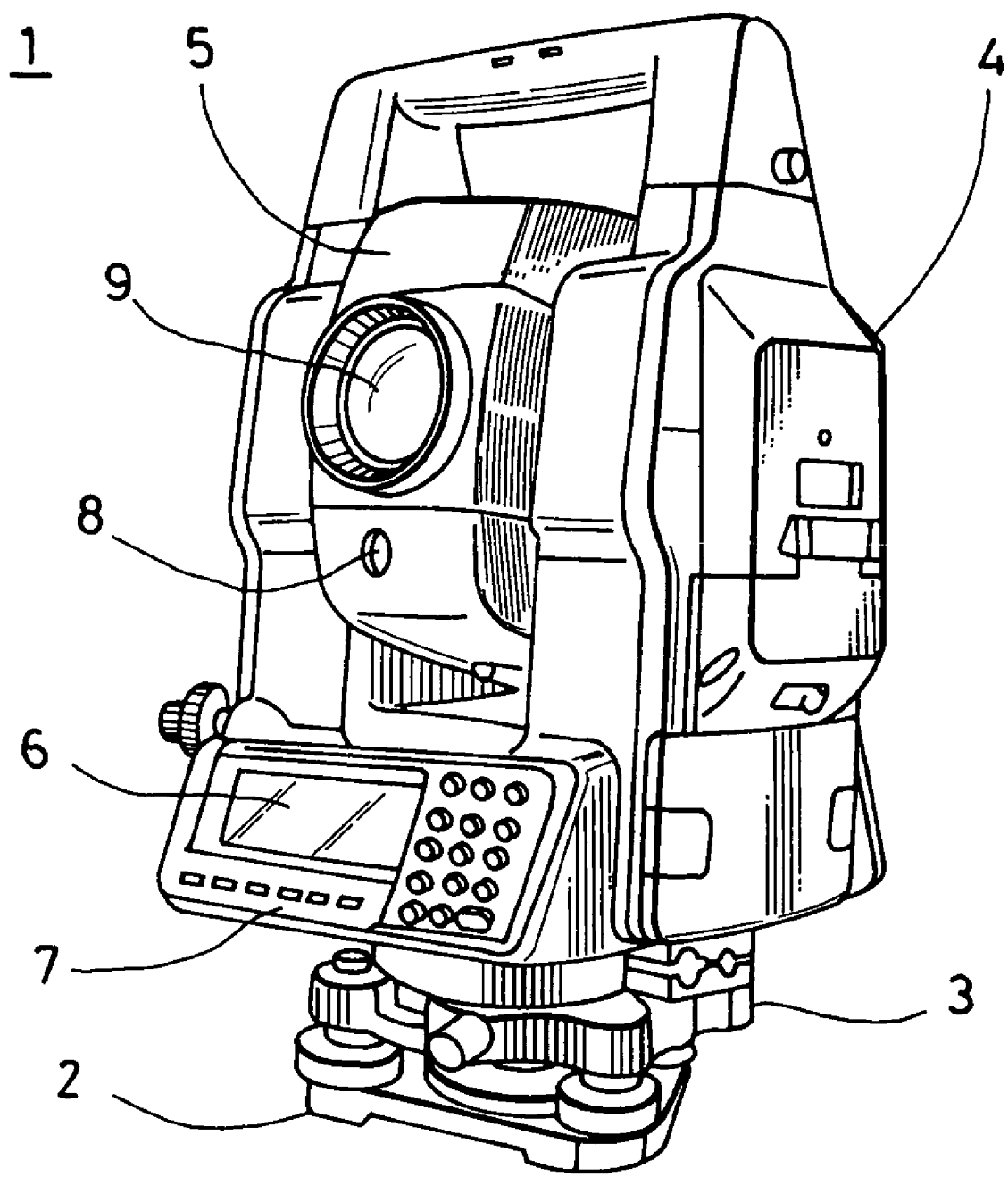
FIG. 1 is an external perspective view of a surveying instrument according to an embodiment of the present invention.

Description will be given below on the best mode for carrying out the invention referring to the drawings.

First, description will be given on general features of a surveying instrument 21 according to the present invention referring to FIG. 1. FIG. 1 represents a main unit 1 of the surveying instrument.

The main unit 1 primarily comprises a leveling unit 2 to be mounted on a tripod (not shown), a base unit 3 mounted on the leveling unit 2, a frame unit 4 rotatably mounted around a vertical axis of the base unit 3, and a telescope unit 5 rotatably mounted around a horizontal axis of the frame unit 4.

The frame unit 4 comprises a display unit 6 and an operation unit 7. The telescope unit 5 comprises a collimating telescope 9 for collimating an object to be measured 8 (see FIG. 2), and an image pickup unit 11, which has an optical axis parallel to the collimating telescope 9 and for picking up an image in a collimating direction. The image pickup unit 11 is a built-in digital camera, for instance. As an image pickup element of the digital camera, an image sensor such as a CCD, etc. is used.

Figure 2:
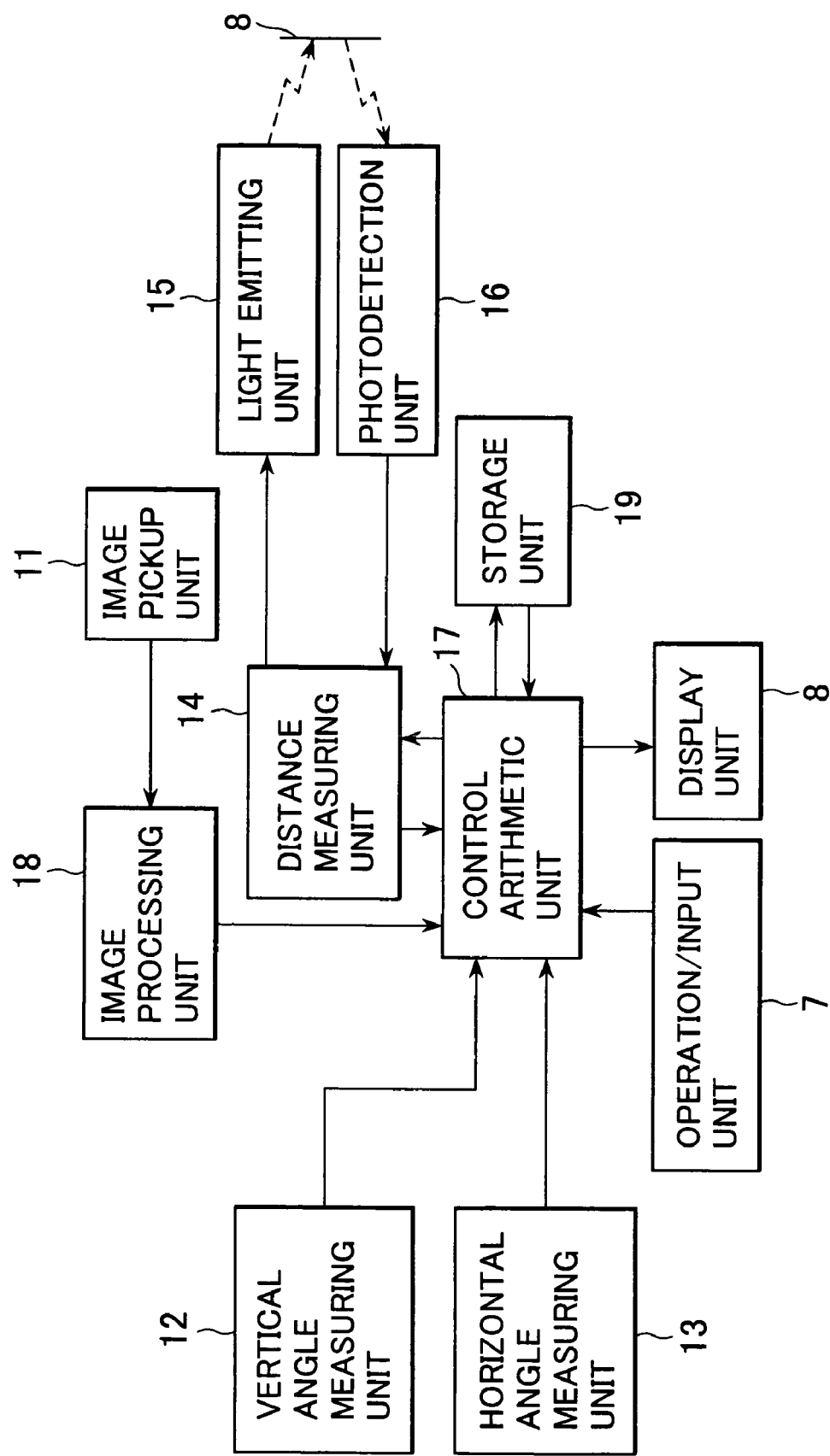
FIG. 2 is a schematical block diagram of the surveying instrument.

Referring to FIG. 2, description will be given on basic arrangement of the main unit 1.

The frame unit 4 comprises a vertical angle measuring unit 12, which is used to detect a vertical angle of the telescope unit 5 and to measure a vertical angle in a collimating direction. The frame unit 4 also comprises a horizontal angle measuring unit 13 for detecting a rotation angle of the frame unit 4 with respect to the base unit 3 and for detecting a horizontal angle in a collimating direction. The telescope unit 5 comprises a distance measuring unit 14 including a distance measuring optical system. The distance measuring unit 14 measures a distance to the object to be measured 8 by finding a phase difference or a time difference when a distance measuring light emitted from a light emitting unit 15 is reflected by the object to be measured 8, and the light is received by a photodetection unit 16. In the frame unit 4, a control unit is incorporated, which comprises a control arithmetic unit 17, an image processing unit 18, and a storage unit 19, etc.

In the storage unit 19, there are stored a calculation program required for surveying, e.g. a coordinate calculating program based on the method of resection, and an image processing program necessary for image processing and acquisition of image information to be described later. Image signals from the image processing unit 18 and measurement results from the distance measuring unit 14, the vertical angle measuring unit 12, and the horizontal angle measuring unit 13 are inputted to the control arithmetic unit 17. Then, an image in a collimating direction is acquired and surveying is performed on distance measurement, and vertical and horizontal angles are surveyed. The image signals and the surveying results are recorded in the storage unit 19 and are displayed on the display unit 6.

Now, description will be given on a method for preparing a stereo image and a method for preparing 3-dimensional data by using the surveying instrument, referring to FIG. 3 to FIG. 6.

The surveying instrument 21 is installed at a known point, i.e. a point (point A) where 3-dimensional data of a ground coordinate system is already known (Step 01). Then, an object to be measured, for which a stereo image is to be prepared, is collimated. Then, distance measurement and angle measurement are performed on a collimating point P1, which can be collimated. For horizontal angle measurement, an angle is measured using a reference direction D0, e.g. an azimuth angle as reference. For vertical angle measurement, an angle is measured using the horizontal angle, for instance, as reference. At the same time as carrying out the distance measurement and the angle measurement, an image of a required range in a collimating direction including the collimating point P1 is taken by the image pickup unit 11.

Figure 3:
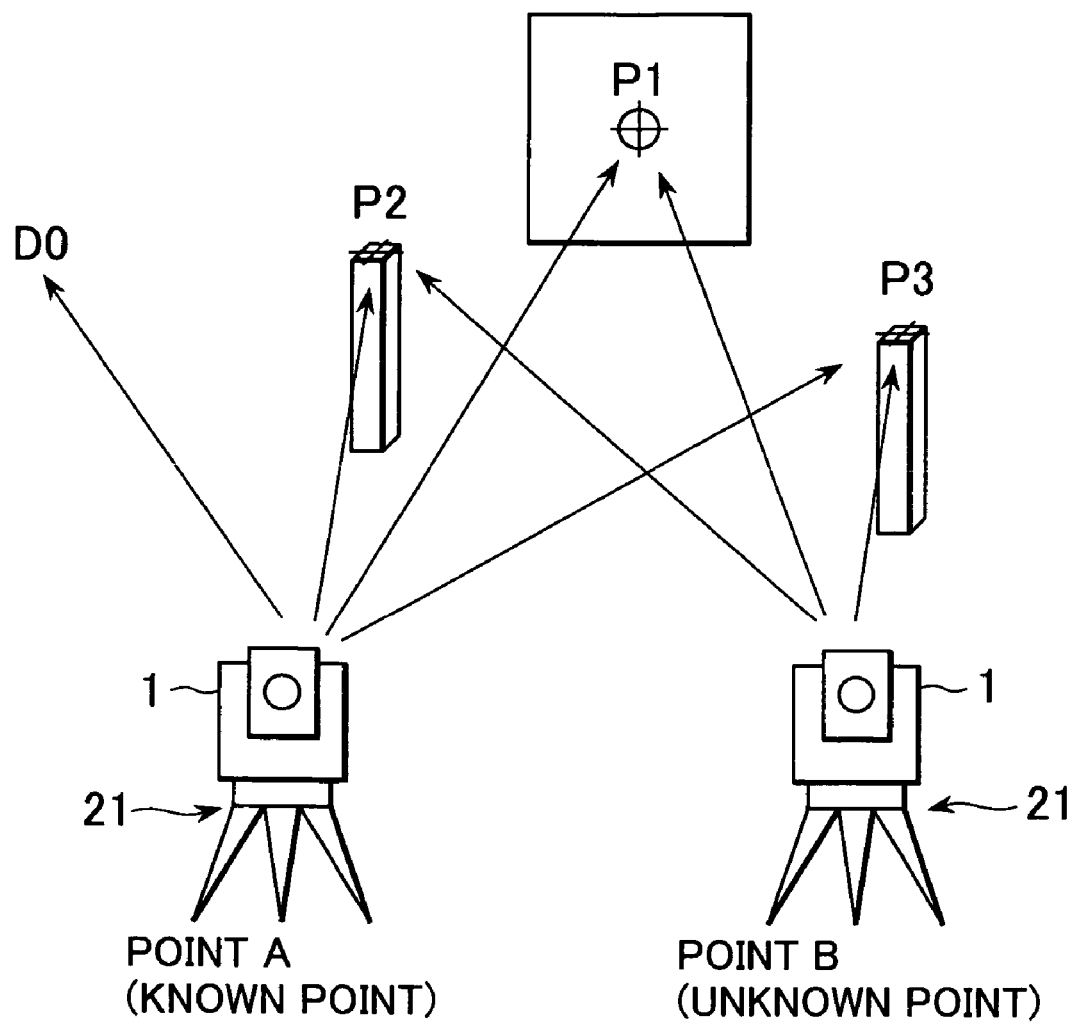
FIG. 3 is a drawing to explain surveying operation in the embodiment of the present invention.
Figure 4:
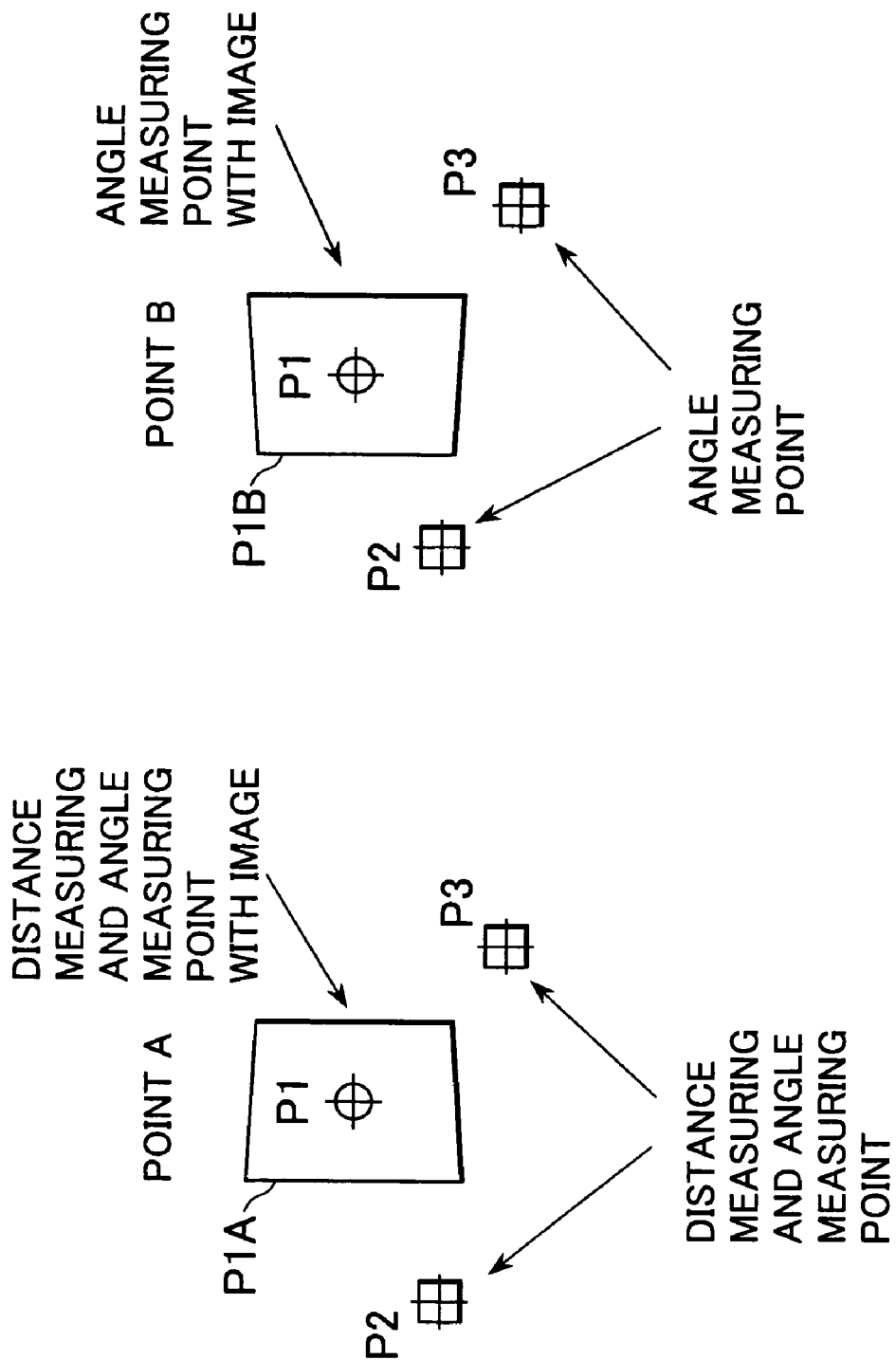
FIG. 4 is a schematical drawing to explain surveying operation in the embodiment of the present invention.

Next, by the surveying instrument 21, distance measurement and angle measurement are carried out on a known point P2 and a known point P3, which are selected arbitrarily (Step 02). The known points P2 and P3 may be within the object to be measured or at other positions. FIG. 3 shows a case where the known points P2 and P3 are outside the object to be measured.

The surveying instrument 21 is moved to an unknown point (point to be surveyed) B (Step 03). The collimating point P1, and the points P2 and P3 which have turned to the known points, are collimated. Angle measurement is performed to the three points P1, P2 and P3. An image is acquired by the image pickup unit 11 on an arbitrary point, e.g. the point P1. An image P1A with respect to the point P1 taken at the point A and an image P1B with respect to the point P1 taken at the point B are recorded in the storage unit 19 as a pair of images (hereinafter referred as "left and right images").

Figure 5:
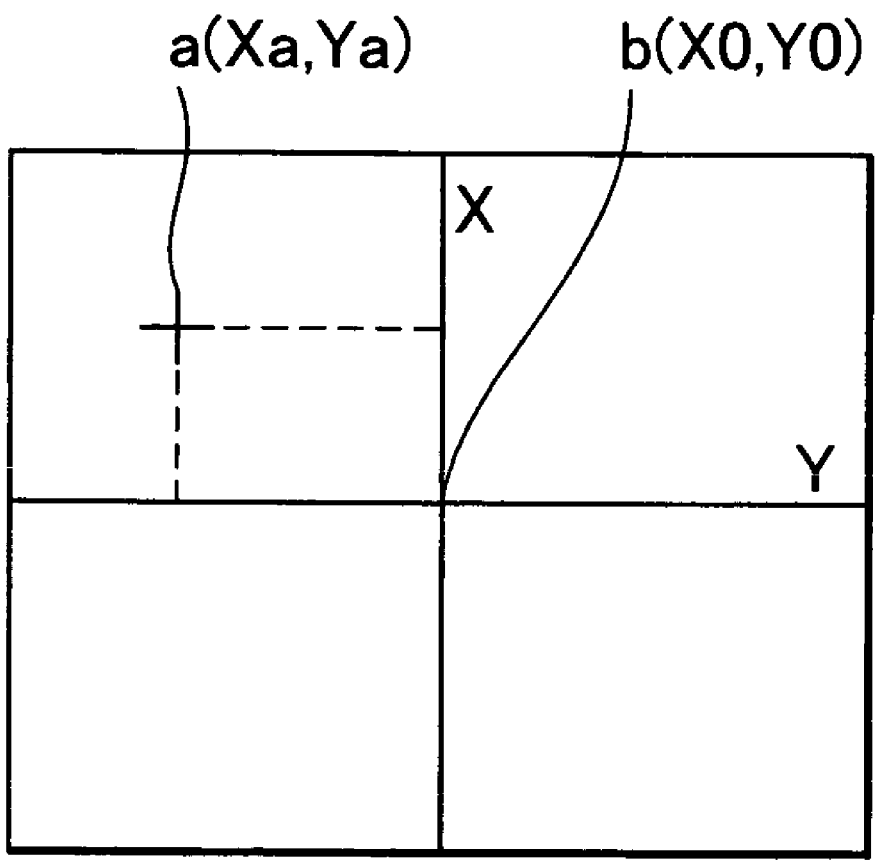
FIG. 5 is a schematical drawing to explain a case where deviation of collimating points of two images is corrected in the embodiment of the present invention.
Figure 6:
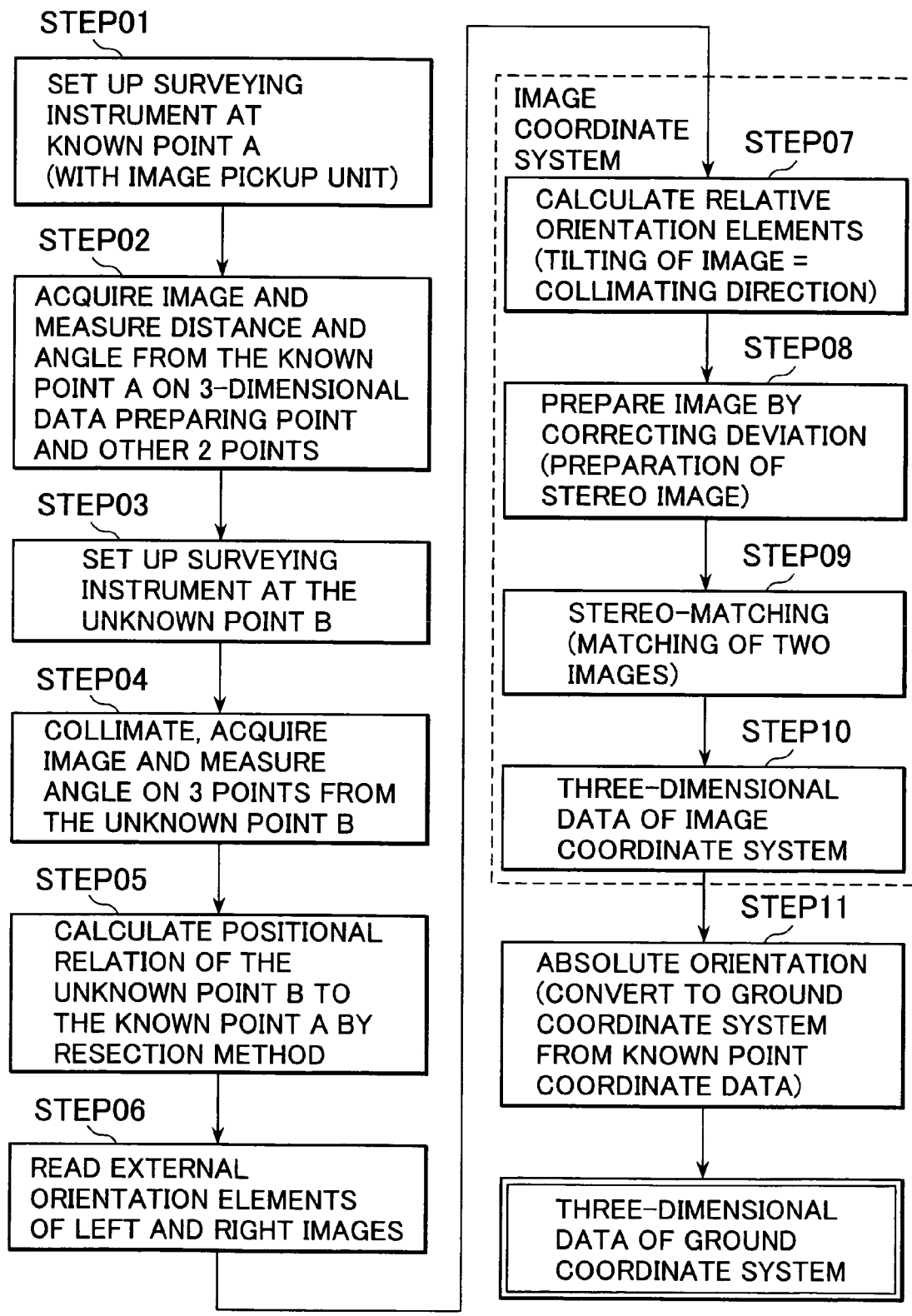
FIG. 6 is a flow chart of operation in the embodiment of the present invention.

As seen in FIG. 5, the image P1A is obtained by collimating the point P1 from the point A, and the image P1B is obtained by collimating the point P1 from the point B. When the image P1A is compared with the image P1B, optical axes of the two images (image centers, i.e. an image center a (Xa, Ya) from the point A, and an image center b (X0, Y0) from the point B) do not necessarily concur with each other. Deviation of the image center a (Xa, Ya) from the image center b (X0, Y0) can be calculated on the screen. It is possible to make the image center a (Xa, Ya) correspond with the image center b (X0, Y0) by calculation.

The control arithmetic unit 17 reads positional data of the collimating point P1, the point P2 and point P3 and angle measurement data from the point B to the collimating point P1, the point P2 and the point P3. From these data, coordinates of the point B are calculated (by the method of resection), and 3-dimensional coordinate data of the point B is obtained. The coordinate data of the point B is associated with the image P1B and is recorded in the storage unit 19 (Step 05).

A position and tilting of the surveying instrument (image pickup unit), i.e. external orientation elements of the left and right images, are read from the storage unit 19. Based on the external orientation elements, relative orientation elements are calculated so as to obtain relative relation of the left and right image pickup units (Step 06 and Step 07).

The left and right images are rearranged based on the relative orientation elements, and left and right stereo images are prepared respectively (Step 08).

Further, corresponding points are extracted, and matching of the stereo images (matching of the left and right stereo images) is performed (Step 09).

The stereo image after matching contains 3-dimensional data on the image. For instance, by designating a pixel on the screen, it is possible to obtain 3-dimensional data to correspond the pixel (Step 10).

Further, based on relation between the coordinate data already known on the image, e.g. the 3-dimensional data of the collimating point P1 on the image and 3-dimensional data on the ground (ground coordinate data) as obtained by surveying, 3-dimensional data of each point on the image is converted to data of ground coordinate system (Step 11).

Figure 7:
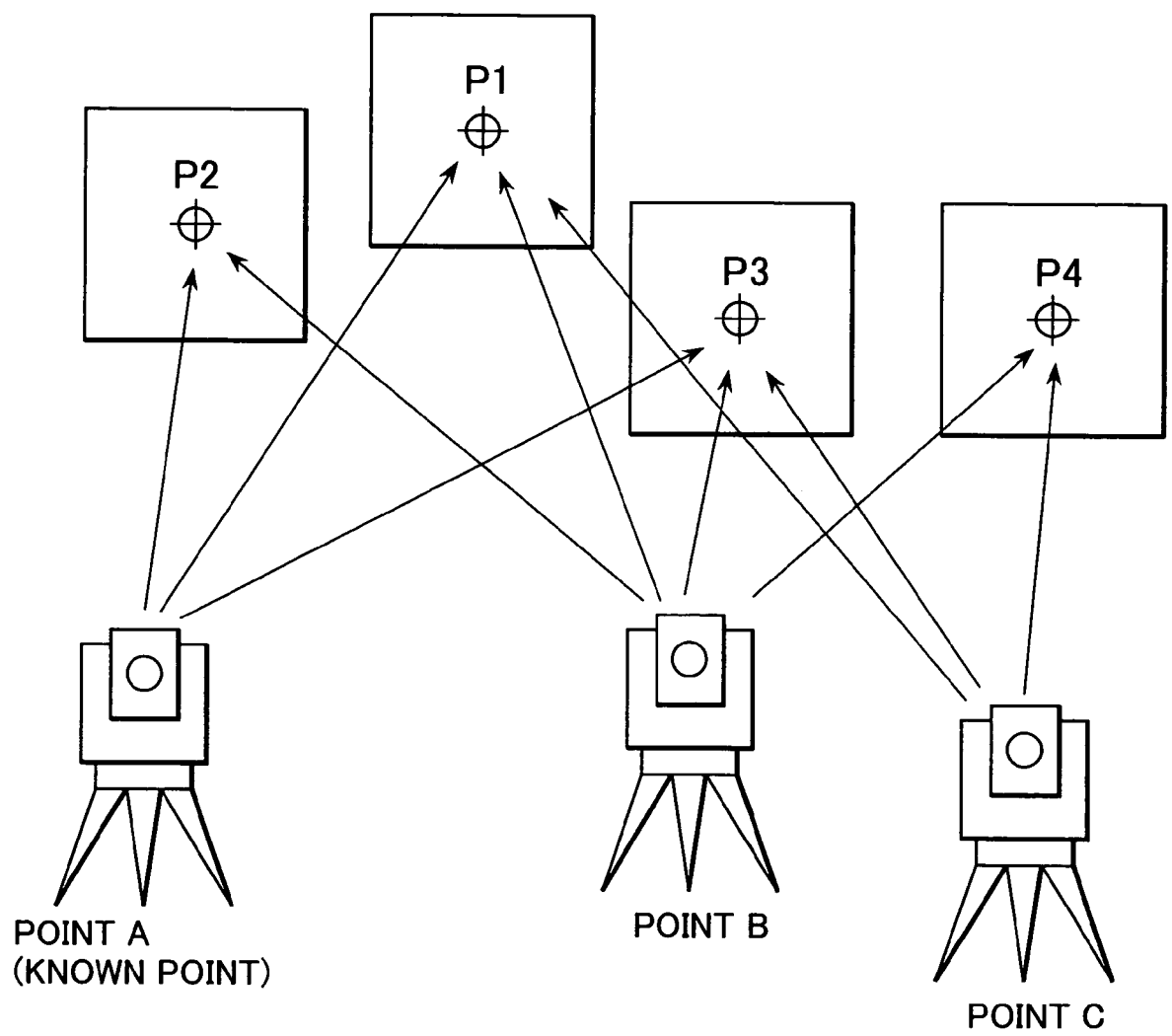
FIG. 7 is a schematical drawing to explain another surveying operation in the embodiment of the present invention.

Next, by referring to FIG. 7, description will be given on preparation of stereo image performing by continuously moving the position of the surveying instrument on an object such as large building, etc., and preparation of 3-dimensional data based on the stereo image. For example, points P1, P2, P3 and P4 are measuring points of images of the object to be measured continuously taken in different directions. From at least 3 points, a position of the surveying instrument can be obtained.

Images are taken on the points P1, P2, and P3 respectively from a point A (a known point) and a point B (an unknown point).

As described above, distance measurement and angle measurement are performed on the points P1, P2 and P3 from the point A. Angle measurement is performed from the point B. From the survey data thus acquired, 3-dimensional coordinate data of the point B can be obtained. Therefore, the point B is turned to a known point.

Next, distance measurement and angle measurement are performed on the points P1, P3, and P4 from the point B, and angle measurement is performed on the point P1, P3 and P4 from a point C. As a result, data for performing coordinate calculation (method of resection) of the point C can be obtained, and 3-dimensional coordinate data of the point C can be acquired. An image is taken from a point C.

External orientation elements of the images taken from the points B and C are obtained. Further, from the external orientation elements of the two images, relative orientation elements can be calculated. As a result, it is possible to associate the stereo images with each other and to prepare 3-dimensional data.

As described above, if a first survey point, i.e. the point A, is set by a surveying instrument with the image pickup unit as a known point, subsequent unknown points can be sequentially turned to known points from at least three points, and it is possible to prepare a stereo image and to prepare 3-dimensional data in wide range.

What is claimed is:

1. A method for preparing stereo images by using a surveying instrument, which comprises an image pickup means for acquiring an image in a collimating direction, and a distance measuring and angle measuring means for measuring a distance and an angle of a collimating point, comprising a step of measuring distances and angles on at least three collimating points by installing said surveying instrument at a known point, a step of measuring angles on the three collimating points by installing said surveying instrument at an unknown point, a step of calculating coordinates of the unknown point based on surveying data of the three collimating points, a step of acquiring images from each of the known point and the unknown point for at least one of the three collimating points, and a step of preparing stereo images from the images from the known point and the unknown point based on coordinate data of the known point, distance measurement data, and angle measurement data from the known point, and based on coordinate data and angle measurement data calculated with respect to the unknown point.

2. A method for preparing stereo images according to claim 1, wherein at least three collimating points can be collimated from the known point and the unknown point, and, in the images acquired from the known point and the unknown point, collimating points from the known point and the unknown point are made correspond with each other based on deviation on the image.

3. A method for preparing stereo images according to claim 2, wherein said method further comprises a the step of acquiring images of all collimating points from the known point and the unknown point, and a step of making the collimating points of the images obtained at the known point correspond with the collimating points of the images obtained at the unknown point respectively.

4. A three-dimensional data preparation system, comprising an image pickup means for acquiring an image in a collimating direction, a distance measuring means capable to measure distance of the collimating point, an angle measuring means capable to measure an angle of the collimating point, a storage unit for storing distance measurement data, angle measurement data and the pickup image, and a control arithmetic unit, wherein said image pickup means takes images from a known point and an unknown point with respect to at least one collimating point among at least three collimating points, said control arithmetic unit calculates coordinate data of the unknown point based on coordinate data of the known point, distance measurement data and angle measurement data of at least three collimating points from the known point, and angle measurement data of said three collimating points from the unknown point, and prepares stereo images from the images based on the coordinate data, the distance measurement data, and the angle measurement data of the known point, and the calculated coordinate data and the angle measurement data of the unknown point.

5. A three-dimensional data preparation system according to claim 4, wherein said two stereo images are associated with each other based on the coordinate data of the known point, the distance measurement data and the angle measurement data of at least three collimating points from the known point and the coordinate data of the unknown point and the angle measurement data from the unknown point, and 3-dimensional data is calculated from the images thus associated.

* * * * *